United States Patent
Cosman et al.

(10) Patent No.: US 7,425,604 B2
(45) Date of Patent: Sep. 16, 2008

(54) PREFORMED EMI/RFI SHIELDING COMPOSITIONS IN SHAPED FORM

(75) Inventors: Michael A. Cosman, Valencia, CA (US); Adrian Balladares, El Segundo, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/585,430

(22) Filed: Oct. 24, 2006

(65) Prior Publication Data

US 2007/0034839 A1     Feb. 15, 2007

Related U.S. Application Data

(63) Continuation of application No. 10/837,337, filed on Apr. 30, 2004, now abandoned.

(60) Provisional application No. 60/466,981, filed on Apr. 30, 2003.

(51) Int. Cl.
C08L 11/00 (2006.01)
C08L 11/12 (2006.01)

(52) U.S. Cl. .................... 528/373; 524/449; 524/779; 525/535

(58) Field of Classification Search ............... 528/373; 524/449, 779; 525/535
See application file for complete search history.

(56) References Cited

U.S. PATENT DOCUMENTS

| | | | | |
|---|---|---|---|---|
| 2,450,940 A * | 10/1948 | Cowan et al. | ............... | 564/138 |
| 2,466,963 A * | 4/1949 | Patrick et al. | ............... | 528/387 |
| 3,659,896 A * | 5/1972 | Smith et al. | .................... | 296/93 |
| 4,137,361 A * | 1/1979 | Deffeyes et al. | ............ | 428/328 |
| 4,366,307 A * | 12/1982 | Singh et al. | ................. | 528/373 |
| 4,606,848 A * | 8/1986 | Bond | ......................... | 252/511 |
| 5,270,364 A * | 12/1993 | Schwartz et al. | ............. | 524/106 |
| 5,284,888 A * | 2/1994 | Morgan | ....................... | 524/93 |
| 5,482,655 A * | 1/1996 | Vogel et al. | .................. | 252/500 |
| 5,661,484 A * | 8/1997 | Shumaker et al. | .............. | 342/1 |
| 5,866,273 A * | 2/1999 | Wiggins et al. | ............. | 428/611 |
| 6,184,280 B1 * | 2/2001 | Shibuta | ....................... | 524/405 |
| 6,201,100 B1 * | 3/2001 | Gorkovenko et al. | ........ | 528/388 |
| 6,358,437 B1 * | 3/2002 | Jonas et al. | .................. | 252/500 |
| 6,372,849 B2 * | 4/2002 | DeMoss et al. | ............. | 525/212 |
| 6,426,863 B1 * | 7/2002 | Munshi | ....................... | 361/503 |
| 6,486,822 B1 * | 11/2002 | Peterman | ....................... | 342/1 |
| 2001/0052591 A1 * | 12/2001 | Kovalev et al. | ............. | 252/500 |
| 2003/0065062 A1 * | 4/2003 | Corvasce et al. | .............. | 524/47 |

FOREIGN PATENT DOCUMENTS

EP      1293530 A2 *   3/2003
WO    WO 00/67339   * 11/2000

OTHER PUBLICATIONS

Encyclopedia of Chemical Technology, vol. 13, 1967, John Wiley & Sons, 398-424.*
Fettes et al., Industrial Engineering Chemistry, Nov. 1950, 2217-2223.*

* cited by examiner

*Primary Examiner*—Duc Truong
(74) *Attorney, Agent, or Firm*—Diane R. Meyers

(57) ABSTRACT

Electrically conductive preformed compositions comprising sulfur-containing polymers in shaped form and the use of preformed compositions in shaped form to seal apertures are disclosed. The preformed compositions can be used to seal an aperture having EMI/RFI shielding effectiveness.

27 Claims, No Drawings

PREFORMED EMI/RFI SHIELDING COMPOSITIONS IN SHAPED FORM

This application is a CON of 10/837,337 filed Apr. 30, 2004 now abandoned, which claims benefit of 60/466,981 filed Apr. 30, 2003.

FIELD

The present disclosure relates to preformed compositions in shaped form and the use of preformed compositions for sealing apertures. The present disclosure further relates to preformed compositions in shaped form exhibiting EMI/RFI shielding effectiveness, and the use of such preformed compositions for sealing apertures.

INTRODUCTION

Electromagnetic interference can be defined as undesired conducted or radiated electrical disturbance from an electrical or electronic source, including transients, which can interfere with the operation of other electrical or electronic apparatus. Such disturbance can occur at frequencies throughout the electromagnetic spectrum. Radio frequency interference ("RFI") is often used interchangeably with electromagnetic interference ("EMI"), although RFI more properly refers to the radio frequency portion of the electromagnetic spectrum usually defined as between 10 kilohertz (KHz) and 100 gigahertz (GHz).

Electronic equipment is typically enclosed in a housing. The housing can serve not only as a physical barrier to protect the internal electronics from the external environment, but also can serve to shield EMI/RFI radiation. Enclosures having the ability to absorb and/or reflect EMI/RFI energy can be employed to confine the EMI/RFI energy within the source device, as well as to insulate the source device or other external devices from other EMI/RFI sources. To maintain accessibility to the internal components, enclosures can be provided with openable or removable accesses such as doors, hatches, panels, or covers. Gaps typically exist between the accesses and the corresponding mating surfaces associated with the accesses that reduce the efficiency of the electromagnetic shielding by presenting openings through which radiant energy may be emitted. Such gaps also present discontinuities in the surface and ground conductivity of the housing and in some cases, may generate a secondary source of EMI/RFI radiation by functioning as a slot antenna.

For filing gaps between the mating surfaces of the housing and removable accesses, gaskets and other seals can be used to maintain electrical continuity across the structures, and to exclude environmental degradants such as particulates, moisture, and corrosive species. Such seals can be bonded or mechanically attached to one or both of the mating surfaces and can function to establish a continuous conductive path by conforming to surface irregularities under an applied pressure.

Conventional processes for manufacturing EMI RFI shielding gaskets include extrusion, molding, and die-cutting. Molding includes the compression or injection molding of an uncured sealant or thermoplastic material into a certain configuration which is then cured to a final shape. Die-cutting includes the forming of a gasket from a cured polymeric material which is cut or stamped using a die into a certain configuration. Form-in-place ("FIP") processes are also used for forming EMI/RFI shielding gaskets wherein the FIP process includes the application of a bead of a viscous, curable, electrically-conductive composition in a fluent state to a surface that is subsequently cured-in-place by the application of heat, atmospheric moisture, or ultraviolet radiation to form an electrically-conductive, EMI/RFI shielding gasket.

Electrical conductivity and EMI/RFI shielding effectiveness can be imparted to polymeric gaskets by incorporating conductive materials within the polymer matrix. The conductive elements can include, for example, metal or metal-plated particles, fabrics, meshes, fibers, and combinations thereof. The metal can be in the form of, for example, filaments, particles, flakes, or spheres. Examples of metals include copper, nickel, silver, aluminum, tin, and steel. Other conductive materials that can be used to impart EMI/RFI shielding effectiveness to polymer compositions include conductive particles or fibers comprising carbon or graphite. Conductive polymers such as polythiophenes, polypyrroles, polyaniline, poly(p-phenylene)vinylene, polyphenylene sulfide, polyphenylene, and polyacetylene can also be used.

In addition to providing continuous electrical conductivity and EMI/RFI shielding effectiveness, in certain applications it is desirable that gaskets or seals to surfaces exposed to the environment, such as in aviation and aerospace vehicles, not lead to corrosion of the metal surfaces. When dissimilar metals and/or conductive composite materials are joined in the presence of an electrolyte, a galvanic potential is established at the interface between the dissimilar conductors. When the interfacial seal is exposed to the environment, particularly under severe environmental conditions such as salt fog or salt fog containing a high concentration of $SO_2$, corrosion of the least noble of the conductive surfaces can occur. Corrosion may lead to a degradation in the EMI/RFI shielding effectiveness of the seal. Mechanisms other than galvanic potentials, for example, crevice corrosion, may also compromise the electrical and mechanical integrity of the enclosure.

Polysulfide polymers are known in the art. The production of polysulfide polymers is characterized by Fettes and Jorzak, Industrial Engineering Chemistry, November 1950, on pages 2,217-2,223. The commercial use of polysulfide polymers in the manufacture of sealants for aerospace applications has long been known and commercially used. For example, polysulfide sealants have been used to seal an aircraft body because of the high tensile strength, high tear strength, thermal resistance, and resistance to high ultraviolet light. Polysulfide sealants have been used to seal aircraft fuel tanks because of the resistance to fuel and adhesion upon exposure to fuel.

Polysulfide sealants are generally applied to a surface by extrusion using a caulking gun. Such a process can be efficient for permanent panels installed on an airframe. However, extruding a sealant to seal apertures in and/or on an airframe such as those associated with access doors or panels can require a significant amount of additional effort. To extrude an uncured sealant, the interior perimeter of the access door opening is masked and the exterior perimeter of the access door is coated with a release agent prior to extruding the sealant to the masked area of the access door opening to avoid sealing an access door shut. The access door is put in place and clamped down to force the excess uncured sealant around the access door. The sealant is then cured and the excess sealant is trimmed away. This process is time intensive and can add significant labor to servicing aircraft with many access doors. Some aircraft can have as many as a hundred or more access doors that are used to cover sensitive electronic equipment or fittings that must be periodically accessed and resealed.

Accordingly, it is desirable to provide a method for sealing access doors, for example those in an airframe of an aviation or aerospace vehicle, that does not require masking, reduces trimming and/or is not as labor and time intensive as the conventional extrusion method for sealing the access doors.

Electrically conductive sealants that exhibit EMI/RFI shielding effectiveness are commercially available. For example, PRC-DeSoto International, Inc. (Glendale, Calif.) manufactures several class B electrically conductive sealants specifically developed for aviation and aerospace applications. For example, PR-2200 Class B electrically conductive sealant is an electrically conductive polythioether sealant that meets the requirements of MMS 327 (Boeing St. Louis Military Material Specification) test methods. These two-part, nickel-filled sealants comprise a polythioether polymer, PERMAPOL P-3.1, and are not corrosive when used on aluminum alloys or between dissimilar metals. However, commercially available sealants such as exemplified by the PR-2200 product are not provided as a preformed composition.

Therefore, it is further desirable to provide a method for sealing access doors to provide effective EMI/RFI shielding and cause minimal corrosion to conductive surfaces in environments encountered in aviation and aerospace applications that does not require masking, reduces trimming and/or is not as labor and time intensive as is the conventional extrusion method for sealing the access doors.

SUMMARY

In accordance with embodiments of the present disclosure, preformed compositions in shaped form comprising a base composition comprising at least one sulfur-containing polymer, and at least one electrically conductive filler; and a curing agent composition; wherein the preformed composition is capable of shielding EMI/RFI radiation, are provided.

In accordance with embodiments of the present disclosure, methods of sealing an aperture to provide EMI/RFI shielding effectiveness comprising applying a preformed composition in shaped-form comprising at least one sulfur-containing polymer, and at least one electrically conductive filler to a surface associated with an aperture; and curing the preformed composition to seal the aperture and provide EMI/RFI shielding effectiveness, are disclosed.

Additional embodiments of the disclosure are set forth in the description which follows, or may be learned by practice of the embodiments of the present disclosure.

DESCRIPTION OF VARIOUS EMBODIMENTS

In certain embodiments of the present disclosure, preformed compositions in shaped form suitable for sealing apertures, for example, elongated apertures in or on the body of an aircraft, comprises at least one sulfur-containing polymer, and at least one electrically conductive filler. The term "preformed" refers to a composition that can be prepared into a particular shape for ease of packaging, storage, and/or application. A composition that is preformed can be reshaped into any shape, either intentionally, or as a result of shipping and/or handling. The term "shaped form" refers to a configuration such that the thickness of the preformed composition is substantially less than the lateral dimension and includes tapes, sheets, and cut-out or gasket forms. The "shaped form" can be, for example, in the form of a tape meaning a narrow shape, strip, or band that can be stored as a roll, coil, or strip. A "shaped form" can also be die-cut to the dimensions of an aperture to be sealed.

The term "sealant," "sealing," or "seal" as used herein refers to compositions that have the ability to resist atmospheric conditions such as moisture and temperature and at least partially block the transmission of materials such as water, fuel, and other liquids and gasses. Sealants often have adhesive properties, but are not simply adhesives that do not have the blocking properties of a sealant. The term "elongated aperture" as used herein refers to an opening in which the length is at least three-times the width.

Preformed sealant compositions of the present disclosure can be prepared by blending an electrically conductive base composition, and a curing agent composition. A base composition and a curing agent composition can be prepared separately, blended to form a sealant composition, and preformed to a particular shape. A conductive base composition can comprise, for example, at least one sulfur-containing polymer, at least one plasticizer, at least one adhesion promoter, at least one corrosion inhibitor, at least one electrically non-conductive filler, at least one electrically conductive filler, and at least one adhesion promoter. A curing agent composition can comprise, for example, at least one curing agent, at least one plasticizer, at least one electrically non-conductive filler, and at least one cure accelerator. In certain embodiments, 5 to 20 parts by weight of a curing agent composition are blended with 100 parts by weight of a base composition, and in certain embodiments, 8 to 16 parts by weight of curing agent composition are blended with 100 parts by weight of a base composition to form an electrically conductive sealant composition.

In certain embodiments, two-component curable compositions are preferred to the one-component curable compositions because the two-component compositions provide the best rheology for application and exhibit desirable physical and chemical properties in the resultant cured composition. As used herein, the two components are referred to as the base composition, and the curing agent composition. In certain embodiments, the base composition can comprise polysulfide polymers, polythioether polymers, oxidizing agents, additives, fillers, plasticizers, organic solvents, adhesion promoters, corrosion inhibitors, and combinations thereof. In certain embodiments, the curing agent composition can comprise curing agents, cure accelerators, cure retardants, plasticizers, additives, fillers, and combinations thereof.

In certain embodiments, sulfur-containing polymers useful in the practice of the present disclosure include polysulfide polymers that contain multiple sulfide groups, i.e., —S—, in the polymer backbone and/or in the terminal or pendent positions on the polymer chain. Such polymers are described in U.S. Pat. No. 2,466,963 wherein the disclosed polymers have multiple —S—S— linkages in the polymer backbone. Other useful polysulfide polymers are those in which the polysulfide linkage is replaced with a polythioether linkage, i.e.,

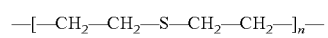

where n can be an integer ranging from 8 to 200 as described in U.S. Pat. No. 4,366,307. The polysulfide polymers can be terminated with non-reactive groups such as alkyl, although in certain embodiments, the polysulfide polymers contain reactive groups in the terminal or pendent positions. Typical reactive groups are thiol, hydroxyl, amino, and vinyl. Such polysulfide polymers are described in the aforementioned U.S. Pat. No. 2,466,963, U.S. Pat. No. 4,366,307, and U.S. Pat. No. 6,372,849, each of which is incorporated herein by reference. Such polysulfide polymers can be cured with curing agents that are reactive with the reactive groups of the polysulfide polymer.

Sulfur-containing polymers of the present disclosure can have number average molecular weights ranging from 500 to 8,000 grams per mole, and in certain embodiments, from 1,000 to 5,000 grams per mole, as determined by gel permeation chromatography using a polystyrene standard. For sulfur-containing polymers that contain reactive functional groups, the sulfur-containing polymers can have average functionalities ranging from 2.05 to 3.0, and in certain embodiments ranging from 2.1 to 2.6. A specific average functionality can be achieved by suitable selection of reactive components. Examples of sulfur-containing polymers include those available from PRC-DeSoto International, Inc. under the trademark PERMAPOL, specifically, PERMAPOL P-3.1 or PERMAPOL P-3, and from Akros Chemicals, such as THIOPLAST G4.

A sulfur-containing polymer can be present in the conductive base composition in an amount ranging from 10% to 40% by weight of the total weight of the conductive base composition, and in certain embodiments can range from 20% to 30% by weight. In certain embodiments, wherein a sulfur-containing polymer comprises a combination of a polysulfide polymer and a polythioether polymer, the amount of polysulfide polymer and polythioether polymer can be similar. For example, the amount of polysulfide polymer and the amount of polythioether polymer in a base composition can each range from 10% by weight to 15% by weight of the total weight of the conductive base composition.

Preformed compositions of the present disclosure comprise at least one curing agent for curing the at least one sulfur-containing polymer. The term "curing agent" refers to any material that can be added to a sulfur-containing polymer to accelerate the curing or gelling of the sulfur-containing polymer. Curing agents are also known as accelerators, catalysts or cure pastes. In certain embodiments, the curing agent is reactive at a temperature ranging from 10° C. to 80° C. The term "reactive" means capable of chemical reaction and includes any level of reaction from partial to complete reaction of a reactant. In certain embodiments, a curing agent is reactive when it provides for cross-linking or gelling of a sulfur-containing polymer.

In certain embodiments, preformed compositions comprise at least one curing agent that contains oxidizing agents capable of oxidizing terminal mercaptan groups of the sulfur-containing polymer to form disulfide bonds. Useful oxidizing agents include, for example, lead dioxide, manganese dioxide, calcium dioxide, sodium perborate monohydrate, calcium peroxide, zinc peroxide, and dichromate. The amount of curing agent in a curing agent composition can range from 25% by weight to 75% by weight of the total weight of the curing agent composition. Additives such as sodium stearate can also be included to improve the stability of the accelerator. For example, a curing agent composition can comprise an amount of cure accelerator ranging from 0.1% to 1.5% by weight based on the total weight of the curing agent composition.

In certain embodiments, preformed compositions of the present disclosure can comprise at least one curing agent containing at least one reactive functional group that is reactive with functional groups attached to the sulfur-containing polymer. Useful curing agents containing at least one reactive functional group that is reactive with functional groups attached to the sulfur-containing polymer include polythiols, such as polythioethers, for curing vinyl-terminated polymers; polyisocyanates such as isophorone diisocyanate, hexamethylene diisocyanate, and mixtures and isocyanurate derivatives thereof for curing thiol-, hydroxyl- and amino-terminated polymers; and, polyepoxides for curing amine- and thiol-terminated polymers. Examples of polyepoxides include hydantoin diepoxide, Bisphenol-A epoxides,. Bisphenol-F epoxides, Novolac-type epoxides, aliphatic polyepoxides, and epoxidized unsaturated resins, and phenolic resins. The term "polyepoxide" refers to a material having a 1,2-epoxy equivalent greater than one and includes monomers, oligomers, and polymers.

A preformed sealant composition can comprise at least one compound to modify the rate of cure. For example, cure accelerants such as dipentamethylene/thiuram/polysulfide mixture can be included in a sealant composition to accelerate the rate of cure, and/or at least one cure retardant such as stearic acid can be added to retard the rate of cure and thereby extend the work life of a sealant composition during application. In certain embodiments, a curing agent composition can comprise an amount of accelerant ranging from 1% to 7% by weight, and/or an amount of cure retardant ranging from 0.1% to 1% by weight, based on the total weight of the curing agent composition. To control the cure properties of the sealant composition, it can also be useful to include at least one material capable of at least partially removing moisture from the sealant composition such as molecular sieve powder. In certain embodiments, a curing agent composition can comprise an amount of material capable of at least partially removing moisture ranging from 0.1% to 1.5% by weight, based on the total weight of the curing agent composition.

In certain embodiments, preformed compositions of the present disclosure can comprise fillers. As used herein, "filler" refers to a non-reactive component in the preformed composition that provides a desired property, such as, for example, electrical conductivity, density, viscosity, mechanical strength, EMI/RFI shielding effectiveness, and the like.

Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, alkaline earth hydroxides, and the like. Fillers also include high band gap materials such as zinc sulfide and inorganic barium compounds. In certain embodiments, an electrically conductive base composition can comprise an amount of electrically non-conductive filler ranging from 2% to 10% by weight, based on the total weight of the base composition, and in certain embodiments, can range from 3% to 7% by weight. In certain embodiments, a curing agent composition can comprise an amount of electrically non-conductive filler ranging from less than 6 percent by weight, and in certain embodiments ranging from 0.5% to 4% by weight, based on the total weight of the curing agent composition.

Fillers used to impart electrical conductivity and EMI/RFI shielding effectiveness to polymer compositions are well known in the art. Examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in the preformed compositions of the present disclosure can be any appropriate shape and size to impart EMI/RFI shielding effectiveness to the cured preformed composition. For example, fillers can be of any shape that is generally used in the manufacture of electrically conductive fillers, including spherical, flake, platelet, particle, powder, irregular, fiber, and the like. In certain preformed sealant compositions of the disclosure, a base composition can comprise Ni-coated graphite as a particle, powder or flake. In certain embodiments, the amount of Ni-coated graphite in a base composition can range from 40% to 80% by weight, and in certain embodiments can range from 50% to 70% by weight, based on the total weight of the base composition. In certain embodiments, an electrically conductive filler can comprise Ni fiber. Ni fiber can have a diameter ranging from 10 µm to 50 µm and have a length ranging from 250 µm to 750 µm. A base composition can comprise, for example, an amount of Ni fiber ranging from 2% to 10% by weight, and in certain embodiments, from 4% to 8% by weight, based on the total weight of the base composition.

Carbon fibers, particularly graphitized carbon fibers, can also be used to impart electrical conductivity to preformed compositions of the present disclosure. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 micron to tens of nanometers can be used as electrically conductive fillers. An example of graphitized carbon fiber suitable for conductive preformed compositions of the present disclosure include PANEX 30MF (Zoltek Companies, Inc., St. Louis, Mo.), a 0.921 micron diameter round fiber having an electrical resistivity of 0.00055 Ω-cm.

The average particle size of an electrically conductive filler can be within a range useful for imparting electrical conductivity to a polymer-based composition. For example, in certain embodiments, the particle size of the one or more fillers can range from 0.25 microns to 250 microns, in certain embodiments can range from 0.25 microns to 75 microns, and in certain embodiments can range from 0.25 microns to 60 microns. In certain embodiments, preformed composition of the present disclosure can comprise Ketjen Black EC-600 JD (Akzo Nobel, Inc., Chicago, Ill.), an electrically conductive carbon black characterized by an iodine absorption of 1000-11500 mg/g (J0/84-5 test method), and a pore volume of 480-510 $cm^3$/100 gm (DBP absorption, KTM 81-3504). In certain embodiments, an electrically conductive carbon black filler is Black Pearls 2000 (Cabot Corporation, Boston, Mass.).

In certain embodiments, electrically conductive polymers can be used to impart or modify the electrical conductivity of preformed compositions of the present disclosure. Polymers having sulfur atoms incorporated into aromatic groups or adjacent to double bonds, such as in polyphenylene sulfide, and polythiophene, are known to be electrically conductive. Other electrically conductive polymers include, for example, polypyrroles, polyaniline, poly(p-phenylene)vinylene, and polyacetylene. In certain embodiments, the sulfur-containing polymers forming a base composition can be polysulfides and/or polythioethers. As such, the sulfur-containing polymers can comprise aromatic sulfur groups and sulfur atoms adjacent to conjugated double bonds such as vinylcyclohexene-dimercaptodioxaoctane groups, to enhance the electrical conductivity of the preformed compositions of the present disclosure.

Preformed sealant compositions of the present disclosure can comprise more than one electrically conductive filler, and the more than one electrically conductive filler can be of the same or different materials and/or shapes. For example, a preformed sealant composition can comprise electrically conductive Ni fibers, and electrically conductive Ni-coated graphite in the form of powder, particles or flakes. The amount and type of electrically conductive filler can be selected to produce a preformed sealant composition which, when cured, exhibits a sheet resistance (four-point resistance) of less than 0.50 Ω/, and in certain embodiments, a sheet resistance less than 0.15 Ω/. The amount and type of filler can also be selected to provide effective EMI/RFI shielding over a frequency range of from 1 MHz to 18 GHz for an aperture sealed using a preformed sealant composition of the present disclosure.

Galvanic corrosion of dissimilar metal surfaces and the conductive compositions of the present disclosure can be minimized or prevented by adding corrosion inhibitors to the composition, and/or by selecting appropriate conductive fillers. In certain embodiments, corrosion inhibitors include strontium chromate, calcium chromate, magnesium chromate, and combinations thereof. U.S. Pat. No. 5,284,888 and U.S. Pat. No. 5,270,364 disclose the use of aromatic triazoles to inhibit corrosion of aluminum and steel surfaces. In certain embodiments, a sacrificial oxygen scavenger such as Zn can be used as a corrosion inhibitor. In certain embodiments, the corrosion inhibitor can comprise less than 10% by weight of the total weight of the electrically conductive preformed composition. In certain embodiments, the corrosion inhibitor can comprise an amount ranging from 2% by weight to 8% by weight of the total weight of the electrically conductive preformed composition. Corrosion between dissimilar metal surfaces can also be minimized or prevented by the selection of the type, amount, and properties of the conductive fillers comprising the preformed composition.

In certain embodiments, preformed compositions of the present disclosure comprise plasticizers such as phthalate esters, chlorinated paraffins, hydrogenated terphenyls, partially hydrogenated terphenyls, and the like. A preformed composition can comprise more than one plasticizer. The amount of plasticizer in the base composition can range from 0.1% to 5% by weight based on the total weight of the base composition, and in certain embodiments, can range from 0.5% to 3% by weight. The amount of plasticizer in the curing agent composition can range from 20% to 60% by weight of the total weight of the curing agent composition, and in certain embodiments, can range from 30% to 40% by weight.

In certain embodiments, preformed compositions further comprise an organic solvent, such as a ketone or an alcohol, for example methyl ethyl ketone, and isopropyl alcohol, or a combination thereof.

In certain embodiments, preformed compositions of the present disclosure comprise adhesion promoters such as, for example, phenolic resin, silane adhesion promoter, and combinations thereof. Adhesion promoters can facilitate adhesion of the polymeric components of the preformed sealant composition to a substrate, as well as to the electrically non-conductive and electrically conductive fillers in the sealant composition. In certain embodiments, a conductive base composition can comprise form 0.15% to 1.5% by weight of a phenolic adhesion promoter, from 0.05% to 0.2% by weight of a mercapto-silane adhesion promoter and from 0.05% to 0.2% by weight of an epoxy-silane adhesion promoter. The total amount of adhesion promoter in the base composition can range from 0.5% to 7% by weight, based on the total weight of the base composition.

In certain embodiments, a base composition can be prepared by batch mixing at least one sulfur-containing polymer, additives, and/or fillers in a double planetary mixer under vacuum. Other suitable mixing equipment includes a kneader extruder, sigma mixer, or double "A" arm mixer. For example, a base composition can be prepared by mixing at least one sulfur-containing polymer, plasticizer, and phenolic adhesion promoter. After the mixture is thoroughly blended, additional constituents can be separately added and mixed using a high shear grinding blade, such as a Cowless blade, until cut it. Examples of additional constituents that can be added to a base composition include corrosion inhibitors, non-conductive fillers, electrically conductive fiber, electrically conductive flake, and silane adhesion promoters. The mixture can then be mixed for an additional 15 to 20 minutes under a vacuum of 27 inches of mercury or greater to reduce or remove entrapped air and/or gases. The base composition can then be extruded from the mixer using a high-pressure piston ram.

A curing agent composition can be prepared by batch mixing a curing agent, additives, and fillers. In certain embodiments, 75% of the total plasticizer such as partially hydrogenated terphenyl and an accelerant such as a dipentamethylene/thiuram/polysulfide mixture are mixed in a single-shaft anchor mixer. Molecular sieve powder is then added and mixed for 2 to 3 minutes. Fifty percent of the total manganese dioxide is then mixed until cut in. Stearic acid, sodium stearate, and the remaining plasticizer are then mixed until cut in followed by the remaining. 50% of the manganese dioxide which is mixed until cut. in. Fumed silica is then mixed until cut in. If the mixture is too thick a surfactant may be added to increase wetting. The curing agent composition is then mixed for 2 to 3 minutes, passed over a three-roll paint mill to achieve a grind, and returned to the single-shaft anchor mixer and mixed for an additional 5 to 10 minutes. The curing agent composition can then be removed from the mixer with a piston ram and placed into storage containers and aged for at least 5 days prior to combining with a base composition.

A base composition and a curing agent composition are mixed together to form a preformed sealant composition. A base composition and a curing agent composition can be combined in the desired ratio using meter mix equipment fitted with a dynamic mix head. Pressure from the meter mix equipment forces the base and curing agent compositions through the dynamic mix head and an extrusion die. In certain embodiments, a preformed composition is extruded into a laminar form such as a tape or sheet. A preformed composition in sheet form can be cut to any desired shape such as defined by the dimensions of an aperture to be sealed. In certain embodiments, the shaped form can be coiled, with release paper separating each ring for packaging purposes. The shaped form can be refrigerated by placing the shaped form on a bed of dry ice and placing another layer of dry ice over the shaped form. The shaped form can be refrigerated immediately after mixing the base composition and the curing agent composition. The shaped form can remain exposed to the dry ice for 5 to 15 minutes and then placed at a storage temperature of −40° C. or lower. The term "refrigerated" refers to reducing the temperature of the preformed composition so as to retard and/or stop the curing of the preformed composition. In certain embodiments, the preformed composition in shaped form is refrigerated below −40° C.

For sealing an aperture, the temperature of the preformed composition is raised to a use temperature ranging from 4° C. to 32° C. (40° F. to 90° F.) prior to application to one or more surfaces associated with the aperture. This is done such that the preformed composition reaches use temperature for no more than 10 minutes prior to application.

In certain embodiments, the preformed composition in shaped form can be used to seal an aperture between a removable access panel and a surface adjacent to the perimeter of an opening in an aircraft fuselage. Adhesion promoter is first brushed on the perimeter of the access panel opening after the surface has been cleaned with a cleaning solvent such as DESOCLEAN (PRC-DeSoto International, Inc.). The surface of the access panel is then cleaned and coated with a release agent prior to applying the preformed composition. The preformed composition in shaped form is manually applied to the surface adjacent to the perimeter of the access panel opening, to the surface adjacent to the perimeter of the access panel, or to both. The access panel is then positioned against the surface adjacent to the opening and clamped down to force the excess preformed composition around the edges of the access panel. Excess preformed composition is easily removed by using, for example, a flat surface. Excess preformed composition can be removed either prior to curing or after the preformed composition has cured, and preferably after the preformed composition cures.

The integrity, moisture resistance, and fuel resistance of the seal resulting from application of preformed compositions of the present disclosure can be evaluated by performing the tests identified in specification MMS 327. An acceptable seal will be tight and resistant to moisture and aircraft fuel.

It is noted that, as used in this specification and the appended claims, the singular forms "a," "an," and, "the" include plural referents unless expressly and unequivocally limited to one referent. Thus, for example, reference to "a filler" includes one or more fillers. Also it is noted that, as used herein, the term "polymer" refers to polymers, oligomers, homopolymers, and copolymers.

For the purposes of this specification and appended claims, unless otherwise indicated, all numbers expressing quantities of ingredients or percentages or proportions of other materials, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

Embodiments of the present disclosure can be further defined by reference to the following examples, which describe in detail the preparation of compositions of the present disclosure and methods for using compositions of the present disclosure. It will be apparent to those skilled in the art that modifications, both to materials and methods, may be practiced without departing from the scope of the present disclosure.

EXAMPLE 1

Example 1 provides an electrically conductive preformed composition in shaped form exhibiting EMI/RFI shielding effectiveness. The following materials were mixed in the proportions according to Table I to provide an electrically conductive base composition: PERMAPOL P 3.1 polythioether polymer from PRC-DeSoto International, Inc., THIOPLAST G4 polysulfide polymer from Akcros Chemicals (New Brunswick, N.J.), phenolic resin adhesion promoter from PRC-DeSoto International, Inc, and HB-40 modified polyphenyl plasticizer from Solutia, Inc. (St. Louis, Mo.).

Using a high shear grinding blade (Cowless blade), the following materials were individually added and blended until cut in: calcium chromate corrosion inhibitor (Wayne Pigment Corp., Milwaukee, Wis.), hydrophobic fumed silica (R202, from Aerosil/Degussa, Diamond Bar Calif.), Ni fiber (30 µm diameter, 500 µm length; from Intramicron, Birmingham, Ala.), Ni-coated graphite (I) (60% Ni-coated graphite; from Novamet, Wyckoff, N.J.), Ni-coated graphite (II) (60% Ni-coated graphite; from Sulzer Metco/Ambeon, Switzerland), mercapto silane adhesion promoter (Silane A189; GE Specialty Materials, Wilton, Conn.), and epoxy silane adhesion promoter (Silane A187; GE Specialty Materials, Wilton, Conn.).

TABLE I

Electrically Conductive Base Composition

| Material | Weight Percentage |
|---|---|
| PERMAPOL P 3.1 Polythioether Polymer | 11.92 |
| THIOPLAST G4 Polysulfide Polymer | 12.04 |
| Phenolic Resin | 0.63 |
| HB-40 Plasticizer | 1.14 |
| Calcium Chromate | 3.69 |
| Silica | 5.23 |
| Ni Fiber | 6.98 |
| Ni-coated Graphite (I) | 29.08 |
| Ni-coated Graphite (II) | 29.08 |
| Silane Adhesion Promoter (mercapto) | 0.10 |
| Silane Adhesion Promoter (epoxy) | 0.10 |

Separately, the following materials were mixed in the amounts according to Table II to form a curing agent composition: manganese dioxide from EaglePicher (Phoenix, Ariz.), partially hydrogenated terphenyl, stearic acid, fumed silica, sodium stearate from Witco Chemicals, molecular sieve powder to remove excess moisture from the curing agent, and dipentamethylene/thiuram/polysulfide mixture from Akrochem Corporation (Akron, Ohio) to accelerate the cure. The curing agent composition was allowed to set or age for at least 5 days before combining with the base composition.

TABLE II

Curing Agent Composition

| Material | Weight Percent |
|---|---|
| Manganese Dioxide | 54.59 |
| Partially Hydrogenated Terphenyl | 35.92 |
| Stearic Acid | 0.60 |
| Fumed Silica | 2.00 |
| Sodium Stearate | 0.73 |
| Molecular Sieve Powder | 0.70 |
| Dipentamethylene/Thiuram/Polysulfide Mixture | 5.46 |

One hundred parts by weight of the electrically conductive base composition according to Table I, and 10 parts by weight of the curing agent composition of Table II were combined to prepare the electrically conductive preformed composition. After thorough mixing and degassing, the electrically conductive preformed composition thus formed was extruded into a tape form and refrigerated at −40° C.

The surface adjacent to the perimeter of an aircraft access panel was first coated with low VOC epoxy primer according to specification MMS-423 and cured. The surface was cleaned and then coated with adhesion promoters PR-148 or PR-184 from PRC-DeSoto International, Inc. The access panel was made from titanium alloy conforming to AMS-T-9046. After the refrigerated electrically conductive preformed composition equilibrated to use temperature, 4° C. to 32° C. (40° F. to 90° F.), the electrically conductive preformed composition in tape form was manually applied to the surface adjacent to the perimeter of the access panel. The access panel was put in place to cover the access opening and clamped down, forcing the excess electrically conductive preformed composition around the edges of the access panel to fill the aperture. Excess electrically conductive preformed composition was easily removed. After 3 to 4 hours at a temperature of 4° C. to 32° C. (40° F. to 90° F.), a tight seal, resistant to moisture and aircraft fuel, resulted.

The cured sealant exhibited a sheet resistance (four-point probe) of less than 0.50 Ω/. Seals to apertures between an aluminum test fixture and a carbon/epoxy lid exhibited shielding effectiveness from 1 MHz to 200 MHz when tested in an anechoic chamber. Similarly sealed apertures also exhibited shielding effectiveness from 0.1 GHz to 18 GHz when tested in a stirred mode chamber.

Other embodiments of the present disclosure will be apparent to those skilled in the art from consideration of the specification and practice of the invention disclosed herein. It is intended that the specification and examples be considered as exemplary only, with the true scope and spirit of the present disclosure being indicated by the following claims.

What is claimed is:

1. A refrigerated, uncured, preformed composition in shaped-form comprising:
    a base composition comprising at least one sulfur-containing polymer, and at least one electrically conductive filler; and
    a curing agent composition;
    wherein the preformed composition is capable of shielding EMI/RFI radiation.

2. The preformed composition of claim 1, wherein the preformed composition comprises 5 parts to 20 parts by weight of the curing agent composition, and 100 parts by weight of the base composition.

3. The preformed composition of claim 1, wherein the at least one sulfur-containing polymer is present in an amount ranging from 10% by weight to 50% by weight of the total weight of the base composition.

4. The preformed composition of claim 1, wherein the at least one sulfur-containing polymer is chosen from a polysulfide polymer, a mercapto-terminated polymer, and a combination of a polysulfide polymer and a mercapto-terminated polymer.

5. The preformed composition of claim 1, wherein the at least one electrically conductive filler is present in an amount ranging from 40% to 80% by weight of the total weight of the base composition.

6. A preformed composition in shaped form comprising a base composition comprising at least one sulfur-containing polymer, and at least one electrically conductive filler, and a curing agent composition; wherein the preformed composition is capable of shielding the EMI/RFI radiation, and wherein at least one electrical conductive filler comprises an Ni fiber and/or an Ni coated graphite.

7. The preformed composition of claim 6, wherein the Ni fiber is present in an amount ranging from 4% to 8% by weight of the total weight of the base composition, and the Ni-coated graphite is present in an amount ranging from 50% to 70% of the total weight of the base composition.

8. The preformed composition of claim 1, further comprising at least one corrosion inhibitor.

9. The preformed composition of claim 8, wherein the at least one corrosion inhibitor inhibits galvanic corrosion.

10. The preformed composition of claim 8, wherein the at least one corrosion inhibitor comprises calcium chromate.

11. The preformed composition of claim 8, wherein the at least one corrosion inhibitor is present in an amount ranging from 3% by weight to 7% by weight of the total weight of the base composition.

12. The preformed composition of claim 1, further comprising at least one adhesion promoter.

13. The preformed composition of claim 12, wherein the at least one adhesion promoter comprises a phenolic adhesion promoter, a mercapto-silane adhesion promoter, and an epoxy-silane adhesion promoter.

14. The preformed composition of claim 12, wherein the at least one adhesion promoter is present in an amount ranging from 1% by weight to 6% by weight of the total weight of the base composition.

15. The preformed composition of claim 1, wherein the preformed composition is curable at a temperature ranging from 10° C. to 30° C.

16. The preformed composition of claim 1, wherein the cured preformed composition exhibits a surface resistivity of less than 0.50 Ω/cm.

17. The preformed composition of claim 1, wherein the curing agent composition comprises a manganese dioxide curing agent.

18. The preformed composition of claim 17, wherein the manganese dioxide is present in the curing agent composition in an amount ranging from 25% to 75% by weight of the total weight of the curing agent composition.

19. A method of sealing an aperture to provide EMI/RFI shielding effectiveness comprising applying a preformed composition in shaped-form comprising at least one sulfur-containing polymer, and at least one electrically conductive filler to a surface associated with an aperture to seal the aperture and provide EMI/RFI shielding effectiveness.

20. The method of claim 19, wherein the preformed composition comprises a preformed composition according to claim 1.

21. The method of claim 19, wherein the surface is a surface of a removable panel.

22. The method of claim 19, wherein the surface is a surface adjacent to an opening.

23. The method of claim 19, wherein the aperture is on an aviation or an aerospace vehicle.

24. The method of claim 19, further comprising applying an adhesion promoter to at least one surface associated with the aperture prior to application of the preformed composition.

25. The method of claim 19, further comprising applying a release agent to at least one surface associated with the aperture prior to application of the preformed composition.

26. The method of claim 19, wherein the sealed aperture exhibits shielding effectiveness from 1 MHz to 18 GHz.

27. The preformed composition of claim 12, wherein the at least one adhesion promoter comprises a phenolic resin.

* * * * *